(12) United States Patent
Spagnolini

(10) Patent No.: US 10,333,584 B2
(45) Date of Patent: Jun. 25, 2019

(54) TRANSPORTING RADIO SIGNALS USING A LOW FREQUENCY BAND OVER COPPER CABLES

(71) Applicant: POLITECNICO DI MILANO, Milan (IT)

(72) Inventor: Umberto Spagnolini, Milan (IT)

(73) Assignee: POLITECNICO DI MILANO, Milan (IT)

( * ) Notice: Subject to any disclaimer, the term of this patent is extended or adjusted under 35 U.S.C. 154(b) by 0 days.

(21) Appl. No.: 15/771,714

(22) PCT Filed: Aug. 8, 2016

(86) PCT No.: PCT/IB2016/054766
§ 371 (c)(1),
(2) Date: Apr. 27, 2018

(87) PCT Pub. No.: WO2017/072601
PCT Pub. Date: May 4, 2017

(65) Prior Publication Data
US 2018/0351601 A1 Dec. 6, 2018

Related U.S. Application Data

(60) Provisional application No. 62/247,218, filed on Oct. 28, 2015.

(51) Int. Cl.
*H04B 3/02* (2006.01)
*H04B 7/0413* (2017.01)
(Continued)

(52) U.S. Cl.
CPC ............. *H04B 3/02* (2013.01); *H04B 1/40* (2013.01); *H04B 7/24* (2013.01); *H04B 10/25758* (2013.01); *H04W 88/085* (2013.01)

(58) Field of Classification Search
USPC .............................................. 455/272, 277.1
See application file for complete search history.

(56) References Cited

U.S. PATENT DOCUMENTS 6,507,608 B1  1/2003  Norrell
9,107,203 B2  8/2015  Spagnolini et al.
(Continued)

OTHER PUBLICATIONS

Written Opinion of the international searching authority dated Apr. 5, 2017 of corresponding application No. PCT/IB2016/054766; 7 pgs.
(Continued)

*Primary Examiner* — Philip Sobutka
(74) *Attorney, Agent, or Firm* — Maier & Maier, PLLC

(57) ABSTRACT

A conversion unit configured for downconverting a RF radio signal from a first RF band to a first LF band, and up-converting an electric signal from a second LF band to a second RF band; the LF and RF bands have same bandwidth, while RF bands are centered on central frequencies being higher than the LF central frequencies of the LF bands. The conversion unit selects the copper cable link and the first LF band on which transmitting the downconverted RF signal according to a predetermined criteria between a plurality of RF frequency bands and the copper cable links. Moreover, the conversion unit selects the RF connection and the second RF band on which transmitting the upconverted LF signal according to a predetermined criteria between said plurality of RF connections and a plurality of RF bands.

17 Claims, 9 Drawing Sheets

(51) Int. Cl.
H04B 7/24 (2006.01)
H04W 88/00 (2009.01)
H04B 1/40 (2015.01)
H04W 88/08 (2009.01)
H04B 10/2575 (2013.01)

(56) References Cited

U.S. PATENT DOCUMENTS

2014/0031049 A1  1/2014  Sundaresan et al.
2016/0013855 A1*  1/2016  Campos .................. H04B 7/12
                                                      370/343

OTHER PUBLICATIONS

Gambini J et al., "Radio over telephone lines in femtocell systems," 21st Annual IEEE International Symposium on PIMRC, Sep. 26, 2010; 6 pgs.
Galve J M et al., "Space-division multi-plexing for the next generation of fiber-wireless access networks," 17th ICTON, Jul. 5, 2015; 4 pgs.
C.Lu, "Connecting the dots: small cells shape up for high-performance indoor radio," Ericsson Review, Dec. 19, 2014; 10 pgs.
Checko et al., "Cloud RAN for Mobile Networks—A Technology Overview," IEEE Communications Surveys & Tutorials (vol. 17, Issue:1), Mar. 2015; 22 pgs.
"CPRI Specifications V.5.0 (Sep. 21, 2011)," Sep. 21, 2011; 119 pgs.
S. Nanba and A. Agata, "A New IQ Data Compression Scheme for Front-haul Link in Centralized RAN," 24th International Symposium on PIMRC, 2013.; 5 pgs.
J. Gambini and U. Spagnolini, "Wireless over cable for energy-efficient femtocell systems," in IEEE Globecom, 2010; 5 pgs.
D. Wake et al., "Radio Over Fiber Link Design for Next Generation Wireless Systems," Journal of Lightwave Technology, 2010; 12 pgs.
J. Gambini and U. Spagnolini, "Wireless over cable for femtocell systems," IEEE Communications Magazine, May 2013; 8 pgs.
J. Cioffi, et al. "Very-high-speed digital subscriber lines." IEEE Communications Magazine, Apr. 1999; 8 pgs.
C.T. Di Minico and P. Kish, "Development of ELFEXT and return loss specifications for Gigabit Ethernet operation on CAT5 copper cabling," at http://www.ieee802.org/3/an/public/material/diminico_IWCS.PDF; 10 pgs.

* cited by examiner

TRANSPORTING RADIO SIGNALS USING A LOW FREQUENCY BAND OVER COPPER CABLES

FIELD

The present invention relates to the field of telecommunication systems, and in particular to the field of radio networks making an intensive usage of distributed and multiple antenna systems, and Multiple Input Multiple Output (MIMO) technology.

BACKGROUND

The usage of multiple antennas and wireless systems with distributed antennas has several benefits as widely reported in literature. The exemplary use case discussed herein is the cellular communication system. The growing demand of throughput and mobility in cellular systems is changing the paradigm of radio access networks (RAN). Small cells and pervasive deployment of antennas appear the only viable solution to increase the RAN capacity in term of throughput per square-km. The centralized RAN (CRAN, shown in FIG. 1) is designed to centrally handle a huge number of antennas to simultaneously serve a large number of users in the same time-frequency resource by taking advance of mutual cooperation for interference mitigation. Antennas, together with a minimal local processing, are hosted in remote units (RUs) deployed at the cell sites or densely geographically distributed indoor/outdoor, while modulation/demodulation processing is carried out at multiple baseband units (BBUs) that are arranged remotely in the same hotel with large benefits in terms of scalability and programmability [1].

Front-hauling is the technical word used to refer to the connection between BBUs and RUs based on the principle of transporting the RU-to-BBU (uplink) and BBU-to-RU (downlink) radiofrequency (RF) signals. Conventionally, front-hauling is designed to exchange the in-phase and quadrature (IQ) streaming of the RF signals after these are digitized and arranged into a sequence of packets according to any of the routinely employed serial protocols such as CPRI [2], or any other similar protocols for digital IQ streaming. Drawback of digitalization of RF signals is the bandwidth expansion that can be as high as ×30, reduced to ×16-18 for compressed CPRI [3]. Even if optical network appears to be the only viable technology to transport several Gbps, the use of several antennas at RUs scales the bandwidth according to their number Na and the corresponding data-rate can easily rise to several tens of Gbps for each RU with multiple antennas. To exemplify, in case of reception of RF signals having 100 MHz bandwidth by one antenna, the digital front-hauling needs at least 3 Gbps (or 1.6-1.8 Gbps if compressed CPRI) for RF signals transport; for a RU with Na=10 antennas the data-rates becomes 30 Gbps (or 16-18 Gbps if compressed), and data-rate can reach hundreds of Gbps for large antennas or aggregated multiple RUs.

In contrast to digital IQ streaming, the direct relaying of the analog RF signals over optical fibers or cables (after some carrier frequency adaptations) avoids any bandwidth expansion and is considered a promising solution that has been investigated in the past also by the inventors.

Wireless or radio over copper (RoC) translates the RF carrier to fit into the bandwidth of twisted pair copper cables to be transported between RU and BBU, the transport of RF carrier can coexist with other services such as xDSL [4]. Benefit of RoC is that it can reuse the pre-existing twisted pair telephone lines, and even the LAN cables that are largely existing in buildings and enterprises, and RoC equipments can be powered over the same cables. Radio over fiber (RoF) uses a similar approach by direct modulation of the laser with RF signals [5]. However, the linearity requested by direct modulation is a severe limitation to the adoption of RoF that leave several research topic still open to the optical communication community.

Applicant has noticed that the RoC architecture is an analog-relay system that offers several benefit, collected in table 1 here below, compared to the digital IQ streaming and RoF. Namely, RoC uses similar RF electronics for up (BB-to-RF) and down (RF-to-BB) conversion to baseband (BB), and the circuitry for bandwidth translation (mixers) are of modest complexity compared to RoF (that needs a linearly modulated laser), or even to CPRI (that needs a fast digitalization and IQ packet aggregation). Latency of analog-relaying is negligible and all latency of RoC is just due to propagation; this is the only viable approach that could enable the 1 ms end-to-end latency forecasted in 5G systems. In addition, RUs in RoC can be remotely powered from BBU hotel by using the copper with the same paradigm of power over Ethernet (PoE) standardized by IEEE 802.3 since 2003 with different power levels.

TABLE 1

|  | CPRI over fiber | RoF | RoC |
| --- | --- | --- | --- |
| Bandwidth | ×18-30 | ×1 | ×1 |
| Latency | Medium (several s) | Very-low | Very-low |
| Complexity of components | High-speed electronics & optics | Low-speed electronics & optics | Low-speed electronics |
| Linearity of components | Recommended | Mandatory (optical components) | Mandatory (electronic components) |
| Synchronization | Packet-level | Carrier frequency and symbols | Carrier frequency and symbols |
| Power supply of RU | no | no | yes |

The first example of RoC was developed for femtocell system with the remotization of the home-antenna and the analog-repetition of the analog radio signal over copper lines is employed by the analog-to-analog (A/A) converter that bi-directionally translates the radio-frequency spectrum to comply with twisted-pair telephone lines [6], or in U.S. Pat. No. 9,107,203. An example of RoC is the RadioDot product by Ericsson [7].

According to [6] summarized in FIG. 2, in the RoC transport over twisted-pair cables, each A/A (20) is connected to one antenna (21), and to one twisted-pair cable (22) acting as front-hauling. The scenario claimed in U.S. Pat. No. 9,107,203 and illustrated here for the context of RU-BBU case is when every RU has one antenna connected to one twisted-pair cable, multiple twisted-pairs are connected to the corresponding RU and all are within the same cable binder (23). RF signals transported over the cables interfere one another due to the electrical coupling among twisted-pairs, this interference is the far-end crosstalk (FEXT). Multiple antennas connecting multiple users with their antennas (called also terminals in jargon) is a Radio MIMO, and the FEXT interfered cables is Cable MIMO. Radio MIMO and cable MIMO compound one another in cascade to yield the radio-cable MIMO (RC-MIMO). Namely, the RC-MIMO is characterized by intra-system interference (i.e., interference arising from the terminals in the same cell or the same carrier frequency, and the cables within the same cable binder), but also inter-system interference (i.e., interference arising by other terminals served by other cells reusing the same carrier frequency, and/or cables using xDSL services coexisting in the same cable binder, or cables too closely spaced apart). Major limitation is that RF signals over cables are mutually FEXT interfering. Since radio access protocols accounts for the adoption of MIMO algorithms as part of the routine processing at BBU, the augmentation of the intra-system FEXT seems not critical for the performance of the overall RC-MIMO system. In other words, at BBU the RC-MIMO is just a more complex MIMO.

In detail, the multicell system of FIG. 2 can be interpreted practically and analytically as the compound of linear operator (matrixes) as sketched in FIG. 2, with matrixes $H_{air}$ accounting for air MIMO (number of users times number of antennas) and $H_{cable}$ accounting for cable MIMO (square matrix with the number of cables).

The uplink system model (downlink model would be dual in broadcasting-mode) can therefore be expressed by the following formula:

$$y = H_{cable} B H_{air} s + H_{cable} B n_{air} + n_{cable}$$

wherein 'y' is the signal received at a BBU, 's' is the uplink signal received by a RU of the C-RAN, $n_{air}$ the number of RU, $n_{cable}$ the number of cables and B the gain matrix of the analog-to-analog (A/A) converters.

It should be noticed that A/A gains are decoupled one another as each A/A device is accessing to one antenna and it is not exchanging direct information with others; for this reason matrix B is a diagonal one having non-null diagonal elements $b_{i,i}$ representing the gain of the i-th A/A converter. Power shaping of A/A has two benefits: pre-compensate (or post-compensate) for the cable attenuation that has a remarkable frequency-dependent attenuation [8].

In order for A/A devices to mitigate the crosstalk interference between cable and xDSL services and to enable high-datarate services, one can use cables that group a set of twisted-pairs with some shielding and possibly without any coexisting other services [7]. Examples are CAT5 or CAT6 cables, conventionally used for Local Area Networks. Although RoC as front-hauling has shown high potentiality and advantages over RoF or CPRI over fiber, there's a need to control the interference in RC-MIMO to enable the transport of wide radio-spectrum of RF signals to provide improved services to the end-users by carrier aggregation and multiple air-protocols (e.g. WiFi, LTE, UMTS, IEEE802.15 for WSN and domotics, 5G, etc. . . . ), and deploy a number of antennas at RU that are higher than the number of twisted-pair copper lines to each RU.

REFERENCES

[1] Checko et al., "Cloud RAN for Mobile Networks—A Technology Overview," in IEEE Communications Surveys & Tutorials (Volume: 17, Issue: 1), March 2015.

[2] "CPRI Specifications V. 5.0 (2011-09-21)," September 2011.

[3] S. Nanba and A. Agata, "A New IQ Data Compression Scheme for Front-haul Link in Centralized RAN," in 24th International Symposium on Personal, Indoor and Mobile Radio Communications, 2013.

[4] J. Gambini and U. Spagnolini, "Wireless over cable for energy-efficient femtocell systems," in IEEE GLOBECOM, 2010, pp. 1464-1468.

[5] D. Wake et al., "Radio Over Fiber Link Design for Next Generation Wireless Systems," Journal of Lightwave Technology, vol. 28, no. 16, pp. 2456-2464, 2010.

[6] J. Gambini and U. Spagnolini, Wireless over cable for femtocell systems, IEEE Comm. Mag., vol. 51, n. 5, pp. 178-185, May 2013.

[7] C. Lu et at., Connecting the dots: small cells shape up for high-performance indoor radio, Ericsson Review, Dec. 19, 2014 (www.ericsson.com/ourportfolio/products/radio-dot-system)

[8] J. Cioffi, et al. "Very-high-speed digital subscriber lines." IEEE Communications Magazine 37.4 (1999): 72-79.

[9] C. T. Di Minico and P. Kish, Development of ELFEXT and return loss specifications for Gigabit Ethernet operation on CAT5 copper cabling, at http://www.ieee802.org/3/an/public/material/diminico_IWCS.PDF

SUMMARY

It is an object of the present invention to overcome the drawbacks of the prior art.

In particular, it is an object of the invention to improve transport of radio signals over copper cables.

It is also an object of the present invention to provide a method and a system for mitigating front-hauling interference in a RoC system.

It is a further object of the present invention to provide a system and a method for improving exploitation of network resources in a radio network.

It is also an object of the present invention a method and a system for managing peaks of traffic between two devices of a radio network.

These and other objects of the present invention are achieved by methods and apparatuses incorporating the features of the annexed claims, which form an integral part of the present description.

In one embodiment, the invention is directed to a conversion unit having an RF interface and an LF interface. The RF interface comprises a plurality of RF connections for receiving and transmitting radio frequency (RF) signals in RF bands, while the LF interface is configured for receiving and transmitting LF signals in LF bands over a plurality of copper cable links. The conversion unit is configured for downconverting a RF radio signal received at the RF interface in a first RF band from the first RF band to a first LF band, and for up-converting an electric signal received via one of the copper cables in a second LF band from the second LF band to a second RF band. The first and second LF bands have same bandwidth respectively of the first and second RF bands and the first and second RF bands are centered on respective RF central frequencies being higher than the LF central frequencies of the first and second LF bands. In downlink, the conversion unit is adapted to select the copper cable link and the first LF band on which transmitting the downconverted RF signal according to a predetermined criteria between a plurality of RF bands and said plurality of copper cable links. In up-link, the conversion unit is adapted to select the RF connection and the second RF band on which transmitting the upconverted LF signal according to a predetermined criteria between said plurality of RF connections and plurality of RF bands.

This solution allows great flexibility in transporting a plurality of RF channels over a limited number of copper cable links. As an example, in a building the conversion unit allows exploitation of existing CAT 5 cablings (e.g. used for LAN connections) for transport of RF signals received from antennas connected (directly or indirectly) to the RF interface of the conversion unit.

In order to reduce the effect of FEXT on cable transmission, in one embodiment the conversion unit is adapted to transmit the downconverted RF signal onto two or more cables and/or onto two or more LF bands.

In a further embodiment, the present invention relates to a remote unit of a radio access network comprising a plurality of antennas for receiving and transmitting radio frequency (RF) radio signals in RF bands, and a plurality of copper cable links of the same cable for receiving and transmitting low frequency (LF) signals in LF bands. The remote unit further comprises a conversion unit operatively connected to the plurality of antennas and to the plurality of copper cable links. The conversion unit, in turn, is configured for downconverting a RF radio signal received by one of the antennas from a first RF band to a first LF band, and for up-converting an electric signal received via one of the copper cables in a second LF band from the second LF band to a second RF band; the first and second LF bands having same bandwidth respectively of the first and second RF bands and being centered on respective RF central frequencies being higher than the LF central frequencies of the first and second LF bands.

The conversion unit is adapted to select the copper cable link and the first LF band on which transmitting the down-converted RF signal according to a predetermined criteria between a plurality of frequency bands and a plurality of copper cable links. The conversion unit is also adapted to select the antenna and the second RF band on which transmitting the upconverted LF signal according to a pre-determined criteria between a plurality of antennas and a plurality of RF bands. The connection between conversion unit and antennas can be direct, or through any RF equipment (amplifiers, combiners, filters, mixers) employed to adapt the RF signal to transmission over an antenna and to reception from an antenna.

This solution allows implementation of several transmission strategies through a copper front-hauling, which provides for a transport over copper that is robust against FEXT.

In a further advantageous embodiment, the RU further comprises an energy storing unit operatively connected to the conversion unit and a power controller. The power controller is adapted to connect one of the copper cable links to the energy storing unit in response to a command from the conversion unit. In this way the conversion unit can allocate at least one of the cable links for power supplying or to LF signal transmission.

In general, the invention is also directed to methods for transporting radio signals over cables.

For uplink connections (e.g. in C-RAN, from mobile user equipments to the radio network), in one embodiment the method comprises
    receiving at least one radio signal by at least an antenna, the radio signal being transmitted in a RF band centered around a RF central frequency,
    selecting, according to a predetermined criteria and between a plurality of frequency bands and a plurality of copper cable links, a transmission cable link and a transmission LF band having same bandwidth of said RF band and being centered around a LF central frequency being lower than the RF central frequency,
    frequency translating, and in particular downconverting, the received radio signal from the RF band to the selected transmission LF band,
    transmitting the down-converted radio signal on the selected copper cable link in the selected transmission LF band.

For downlink connections (e.g. in C-RAN, from the radio network to mobile user equipments), in one embodiment the method comprises
    receiving an electric signal over a copper cable link, the electric signal being transmitted in a LF band centered around a LF central frequency,
    selecting, according to a predetermined criteria and between a plurality of antennas and a plurality of frequency bands, at least an antenna and a transmission RF band having same bandwidth of the LF band and being centered on a central frequency RF band higher of the LF band,
    up-converting the received electric signal from the LF band to the selected transmission RF band,
    transmitting the up-converted electric signal via a radio link by means of the selected antenna/s.

Further advantageous characteristics are the subject matter of the annexed claims, which are an integral part of the present description.

BRIEF DESCRIPTION OF THE DRAWINGS

The invention will be described below with reference to non-limiting examples, provided by way of example and not as a limitation in the annexed drawings. These drawings show different aspects and embodiments of the present invention and, where appropriate, reference numerals showing like structures, components, materials and/or elements in different figures are denoted by like reference numerals.

DETAILED DESCRIPTION

Figure 1:
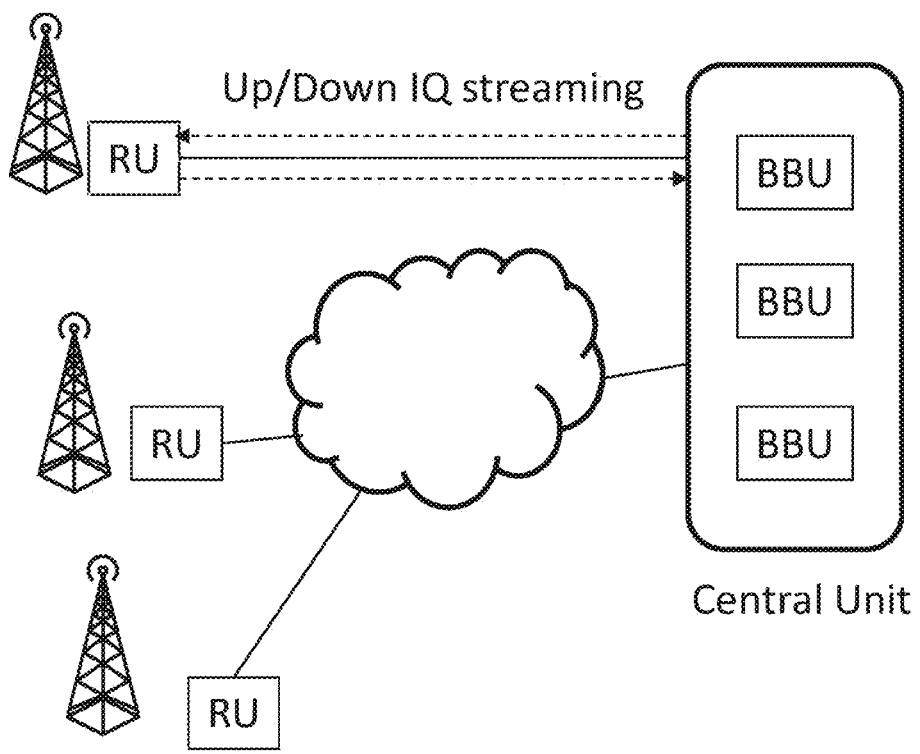
FIG. 1 illustrates a centralized radio access network according to the prior art.
Figure 2:
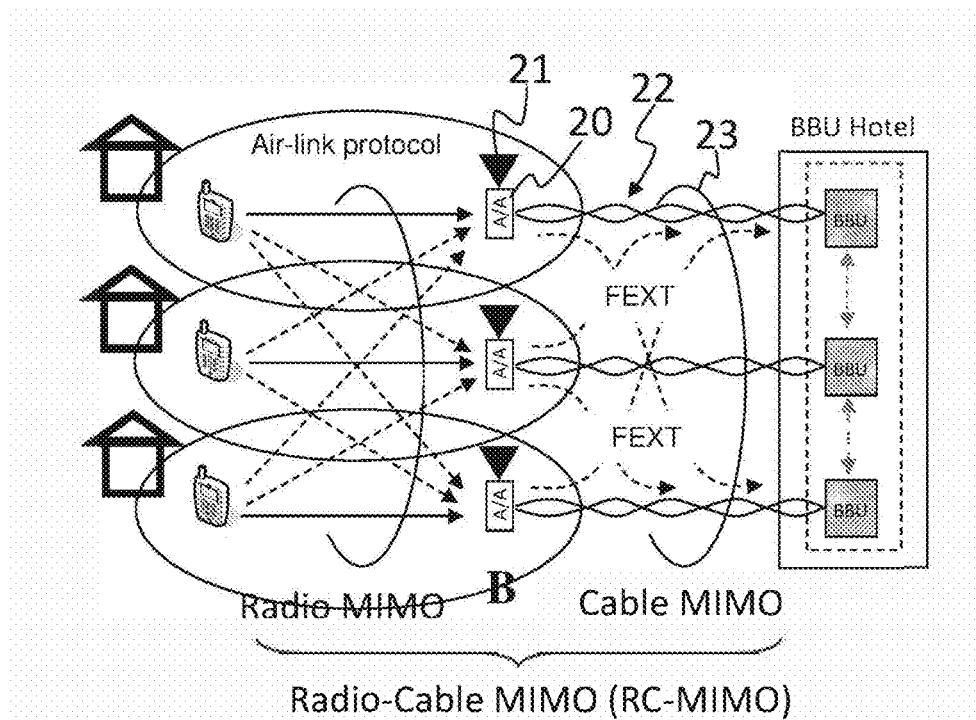
FIG. 2 illustrates a centralized radio access network according to the prior art and the interference between signals exchanged.
Figure 2:
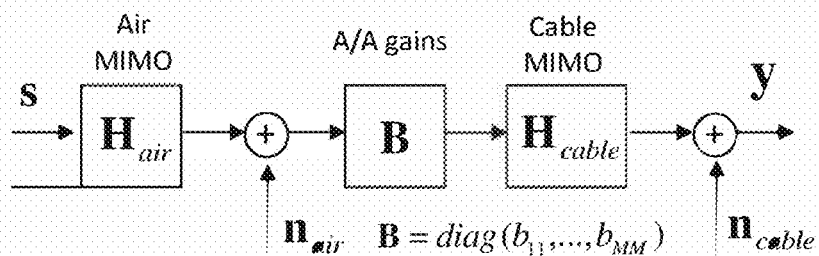

While the invention is susceptible of various modifications and alternative embodiments, some preferred embodiments are shown in the drawings and will be described below in detail.

It should be understood, however, that there is no intention to limit the invention to the specific embodiment disclosed, but, on the contrary, the invention intends to cover all modifications, alternative forms, and equivalents falling within the scope of the invention as defined in the claims.

The use of "for example", "etc", "or" indicates non-exclusive alternatives without limitation unless otherwise defined.

The use of "including" means "including, but not limited to," unless otherwise defined. Radio Frequency, shortened RF, is used to indicate a frequency spectrum wherein frequencies are equal to or higher than 1 GHz.

Low Frequency, shortened LF, is used to indicate a frequency spectrum wherein frequencies are lower than 1 GHz.

Figure 3:
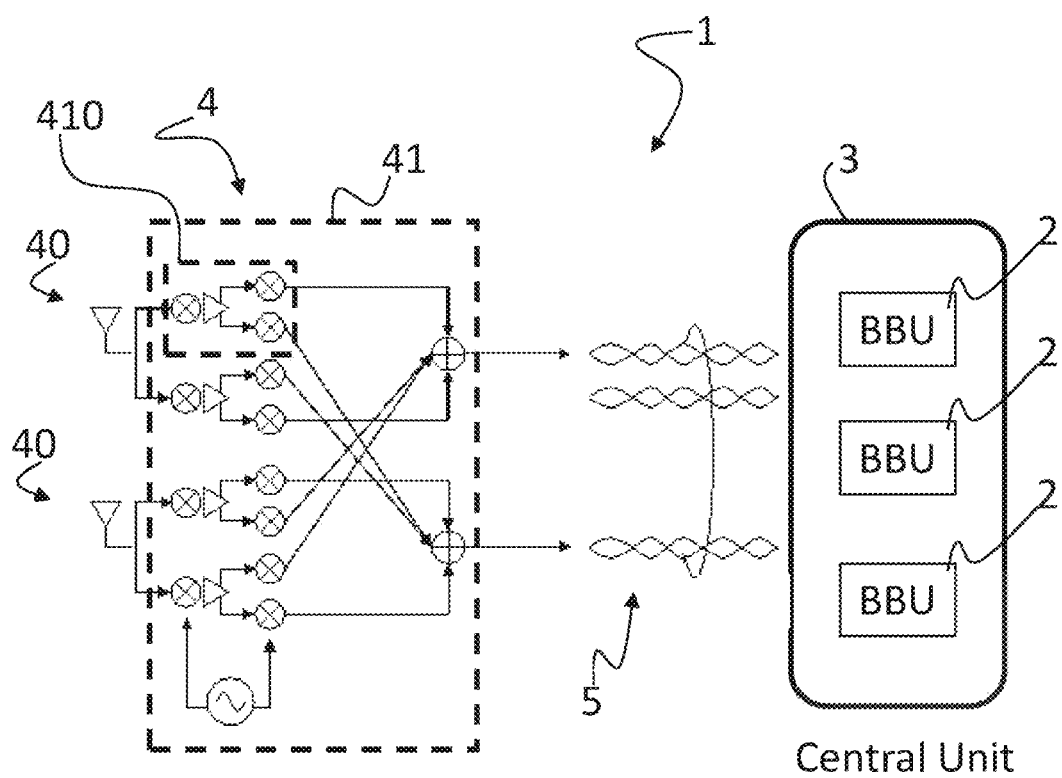
FIG. 3 schematically illustrates a centralized radio access network with RF signal transport according to an embodiment of the invention.

FIG. 3 schematically illustrates a radio access network 1 according to an embodiment of the present invention.

The radio access network of FIG. 3 is of the centralized type, i.e. a C-RAN, wherein several Base Band Units (BBUs, 2) are located in the same place to form a Central Unit (3) wherein baseband (BB) signals transmitted by remote Remote Units (RUs), 4) are processed before transmission to the core network. For sake of clarity, only one remote unit 4 is presented in FIG. 3.

The remote unit 4 comprises $N_a$ co-located antennas 40 ($N_a$ being an integer preferably bigger than 1) for receiving several uplink radio signals from mobile user equipments, (like smartphones, tablet, Personal Computers and the like) and dually for transmitting downlink radio signals to the user equipments. The number and type of antennas can be any, in this way a remote unit 4 can be equipped with one or more antennas for LTE communications, one or more for UMTS communications, one or more for Wi-Fi, one or more for Wi-Max and so on, based on the type of services provided by the network operator and the corresponding carrier frequency.

Remote unit 4 further comprises a frequency conversion unit 41 connected to the $N_a$ antennas 40 on one side via an RF interface, and with a plurality of copper cable links on the other side via an LF (Low Frequency) interface.

RF interface comprises a plurality of connections for connecting to the Na antennas. It is hereby understood that, notwithstanding in FIG. 3 antennas 40 are directly connected to the RF interface of the conversion unit 41, other embodiments are possible and antennas can be connected to the conversion unit via amplifiers and other active or passive devices.

LF interface comprises one or more connectors and/or equipments for connecting the conversion unit to one or more cables including copper wires forming cable links wherein LF signals can be exchanged with the BBU. For sake of simplicity, in this embodiment only one cable 5 is illustrated in FIG. 3. Cable 5 can comprise more twisted pairs (each pair including two twisted copper wires) grouped into the same cable starting with a "quad" (M=2 twisted pairs in a cable). In order to protect the twisted pairs from external interferences or from cross talk interference, each cable 5 can be provided with external shielding and the number of twists per centimeters can be selected in order to increase protection against cross talk interference. Cable 5 can be any of a CAT5, CAT5e, CAT6, CAT6a, CAT7 or CAT8 cable type or better, and it can be substituted by several independent copper wires or twisted pair, in particular by cables including at least two twisted pairs, preferably shielded and/or twisted. Conversion unit 41 therefore receives radio frequency (RF) signals transmitted in different RF spectra and down-converts them in different basebands having same bandwidth of the received radio signals.

In this embodiment, each RF signal in high-frequency spectrum is converted baseband by one RF down-converter 410 for each frequency and each antenna. The conversion unit 41 maps the radio frequency (RF) bandwidths to the cable links according to predetermined criteria which preferably minimize the impairment of FEXT both for the uplink, when signals are sent toward the BBU, and for the downlink, when signals moves from the BBU to the RUs. To exemplify, one criteria could be to map each antenna over each cable link and keep the spectral mapping mutually orthogonal one another. Alternatively, the RF signals from multiple radio channels (possibly with different bandwidth each) and multiple antennas can be mapped over multiple frequencies of a single cable link to mimic a redundant communication over cable to mitigate the FEXT at the BBU as part of the BBU processing. Or any combination, thereof.

Figure 4:
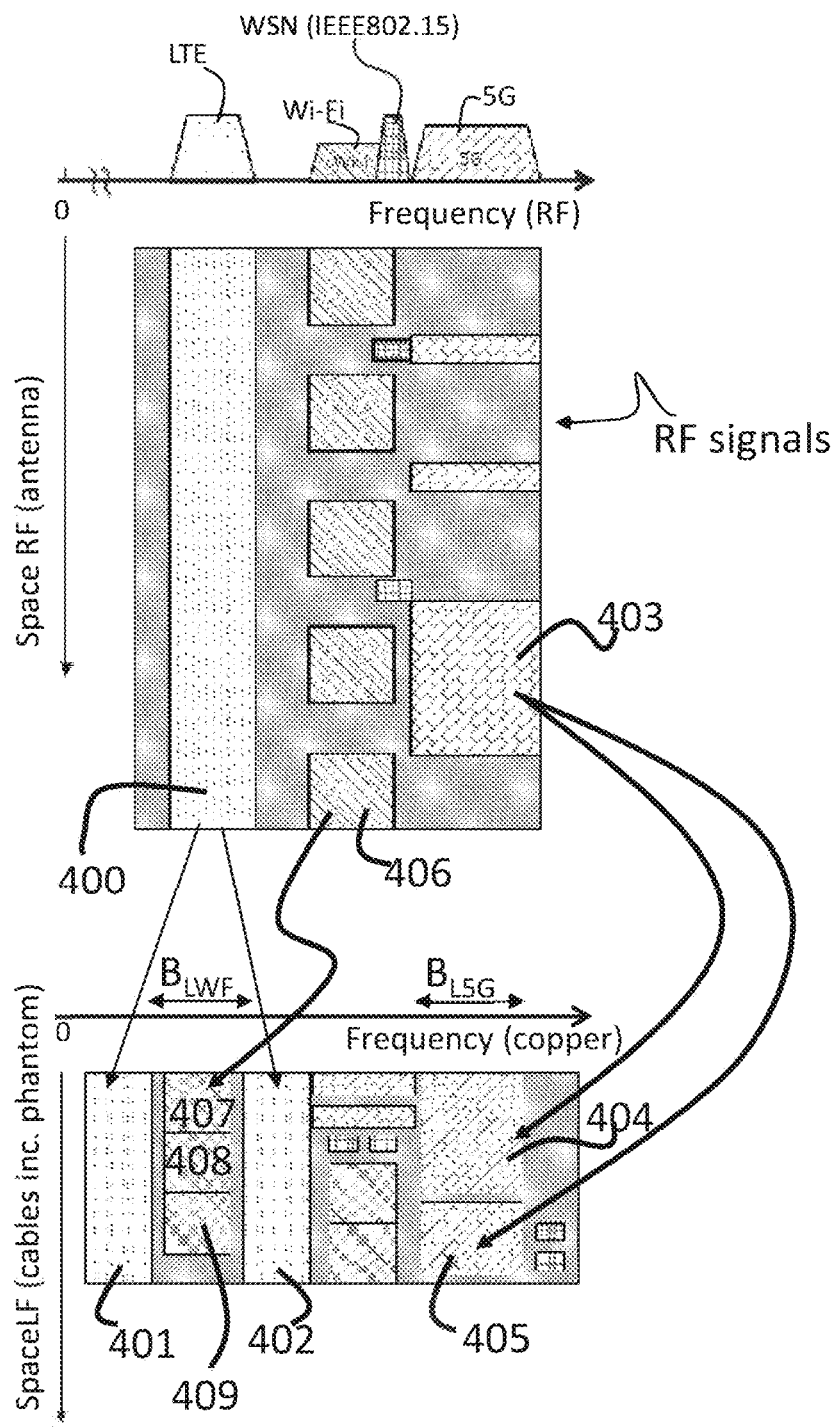
FIG. 4 illustrates a Space-Frequency to Space-Frequency (SF2SF) mapping implemented by the conversion unit in a Remote Unit (RU) of the centralized radio access network of FIG. 3.

FIG. 4 shows an example of Space-frequency to Space Frequency (SF2SF) conversion method implemented by the conversion unit 41. In this figure, RF signals (top portion of FIG. 4) of different services (LTE, Wi-Fi, WSN and 5G in this example) are received by the Na antennas of the remote unit 4 at different frequencies. In the RF domain, the space dimension is therefore constituted by the different antennas.

Conversion unit 41 receives the RF signals in first RF bands being centered on respective RF central frequencies and having a given bandwidth, usually depending on the type of service. Conversion unit downconverts the RF signals onto different low frequency (LF) bands centered on second LF central frequencies being lower than the respective RF central frequencies and each having bandwidth equal to that of the RF signals.

Figure 5:
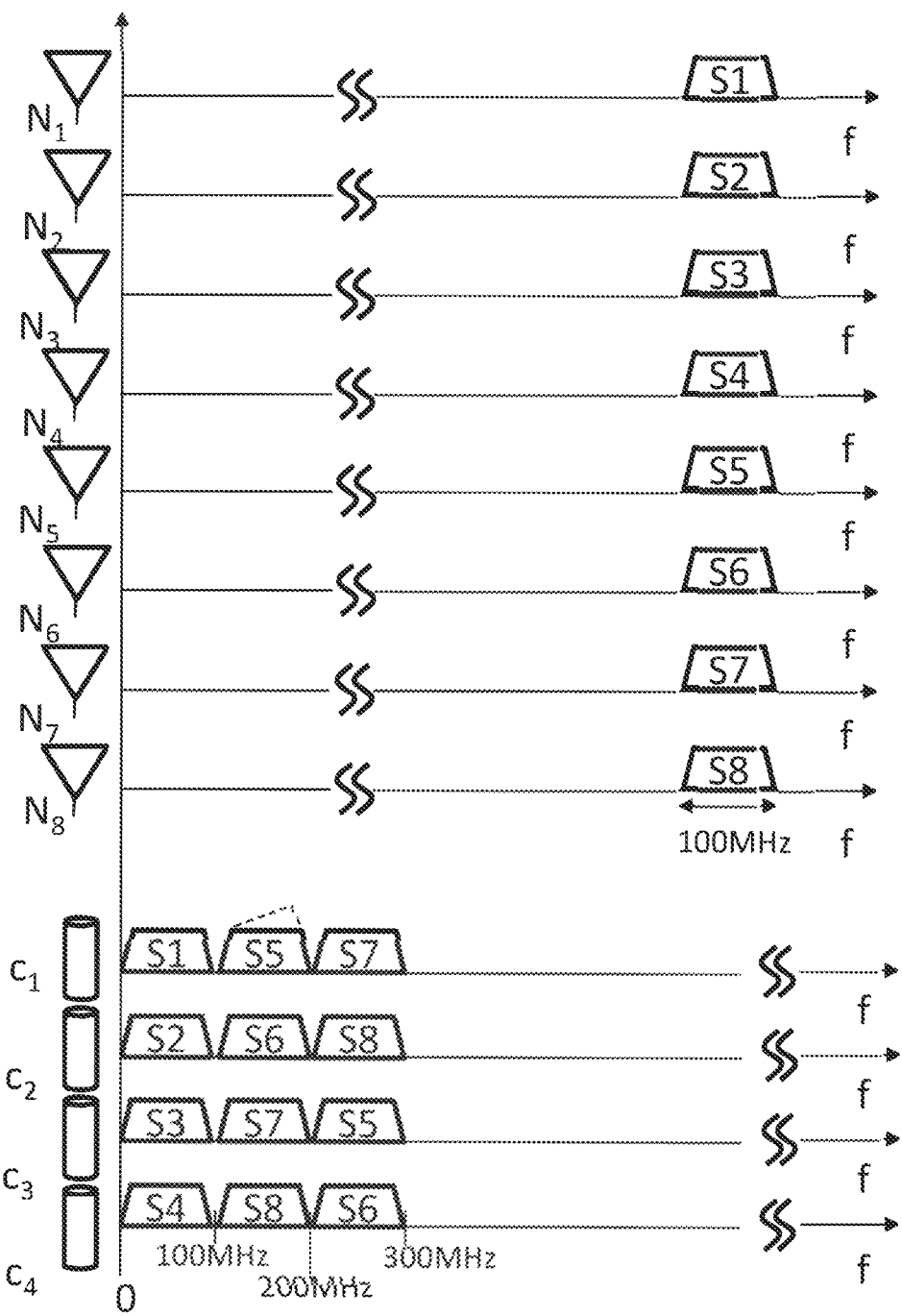
FIG. 5 is a variant of the SF2SF of FIG. 4.

As shown in FIG. 4, and as better illustrated in FIG. 5, conversion unit 41 not only is able to downconvert the RF signals, but it is also able to:

duplicate the downconverted signals in a plurality of LF bands, as illustrated in FIG. 4, wherein RF signals 400 of an LTE service are dowconverted in two separate LF frequency bands 401 and 402, transmit the whole RF signal or a portion thereof from some antennas, onto two different cable links in the same LF band or in different LF bands, as illustrated in FIG. 4, wherein RF signals 403 of a 5G service from multiple antennas are downconverted in a LF band $B_{L5G}$ and transmitted on a first set of cable links 404, and in part downconverted in the same frequency band $B_{L5G}$ but transmitted on a second set of cable links 405, or as illustrated in FIG. 4 wherein RF signals 406 of a Wi-Fi service are downconverted in a frequency band $B_{LWF}$ having same bandwidth of the RF signals, onto three different cable link 407, 408, 409.

Conversion unit 41 is therefore able to implement a space/frequency to space/frequency conversion method, wherein, in uplink, RF signals received from a certain antenna (space) in given RF frequency bandwidth (frequency) are downconverted in a different LF band (frequency conversion) and transmitted onto one or more cable links (space conversion), and, vice versa in downlink, signals received from a BBU on a given cable link can be transmitted by different antennas at different RF frequencies. Space/frequency to space/frequency conversion is also a method that aims to pack the RF signals from a plurality of antennas and RF carriers onto a set of twisted pairs (e.g., 4 pairs in CAT5 type or better) and a maximum LF bandwidth capability (e.g., approx 500 MHz/pair for CAT5). The packing of SF2SF conversion exemplified in FIG. 4 is according to a predefined rule to maximize the copper transport capability for multiple RF carriers and multiple antennas.

In one embodiment, the downconversion process of the conversion unit 41 can include a combining processing of the signals to generate other signals that are better suited for the transport over copper medium such as for example beamforming, FEXT cancellation, spreading expansion codes or any combination. Examples herein are not meant to limit the bounding of the possible applications and the technical solutions. To further exemplify, let us consider a 5G service with eight antennas (labelled as $N_1$-$N_8$) and RF bandwidth of 100 MHz, as illustrated in FIG. 5. The front-hauling is over CAT5 cable with M=4 pairs and length below 100 m, the overall bandwidth over this CAT5 cable can be as high as 400-500 MHz (bandwidth is higher for better type cables), with different FEXT and attenuation profile vs frequency. The 100 MHz bandwidth signal from the RU with eight antennas needs 8×100 MHz=800 MHz of total bandwidth for transport of the RF signal from the RU to the BBU, while M=4 pairs with (al last) 400 MHz/each can offer an overall capability of transport as much as 4×400 MHz=1600 MHz with different cable FEXT and attenuation profiles. The RF signals toward the BBU (only uplink is considered in this example) can be allocated with large easiness into the four twisted copper pairs and redundated such as in table 2 below.

In this example, signals S1-S4 from antennas $N_1$-$N_4$ can be downconverted in the lower frequency portion (0-100 MHz) of the cable link where it is guaranteed a certain degree of cross-talk shielding.

Signals S5-S8 from antennas $N_5$-$N_8$ can be allocated on 100-200 MHz band and repeated on 200-300 MHz band, where FEXT is more severe. These repetitions are used at BBU to mitigate cable FEXT by mimicking the MIMO diversity routinely employed in wireless with FEXT mitigation methods that are limited here to four copper cable links. In this example, RF signals can be further redundated or processed at conversion unit before being transmitted onto the cables by exploiting the overall 4×400 MHz=1600 MHz of CAT5 copper cable, for 8×100 MHz=800 MHz of RF signals from 8 antennas.

TABLE 2

| Twisted pair # | 0-100 MHz | 100-200 MHz | 200-300 MHz |
|---|---|---|---|
| #1 | ant1 | ant5 | ant7 |
| #2 | ant2 | ant6 | ant8 |
| #3 | ant3 | ant7 | ant5 |
| #4 | ant4 | ant8 | ant6 |

The criteria adopted by conversion unit 41 to implement the SF2SF mapping method can be static or dynamic, and this can optimize the performance of the RC-MIMO by including the choice of frequency and cable link allocation as degrees of freedom to minimize the influence of FEXT in RoC technology. In the case of dynamic mapping, conversion unit 41 is configured to receive control commands from the BBUs, or from a remote control center of the radio network, which provides information for allocating the RF signals on different copper cable links and LF frequencies. In one embodiment, control signals provides priority rules, like voice has priority over data, or direct indication of the most critical radio channels or vulnerable RF signals, so that conversion unit decides which channels to put in the lower frequency bands of the cables and/or which channels needs to be redundated or processed to be protected against FEXT. Alternatively, control signals sent by the BBU provides to the control unit the indication of which RF signals needs to be transported in the lower LF bands and which need to be redundated on different copper cable links and/or on different LF bands. As an example the RF signal S5 from antenna $N_5$ can be combined with others to resist against cable FEXT using a beamforming method, pre-emphasized to cope with cable attenuation, downconverted in the LF band 100-200 MHz and transmitted over the twisted pair #1. This is shown in FIG. 5 in dotted lines, wherein higher frequencies of the downconverted signal S5 are amplified to resist to cable attenuation. Pre-emphasis can be used to let the LF signals from RF signals to comply with power spectral density requirements by external regulatory entities for cable communications or by maximum power allocation.

Figure 6:
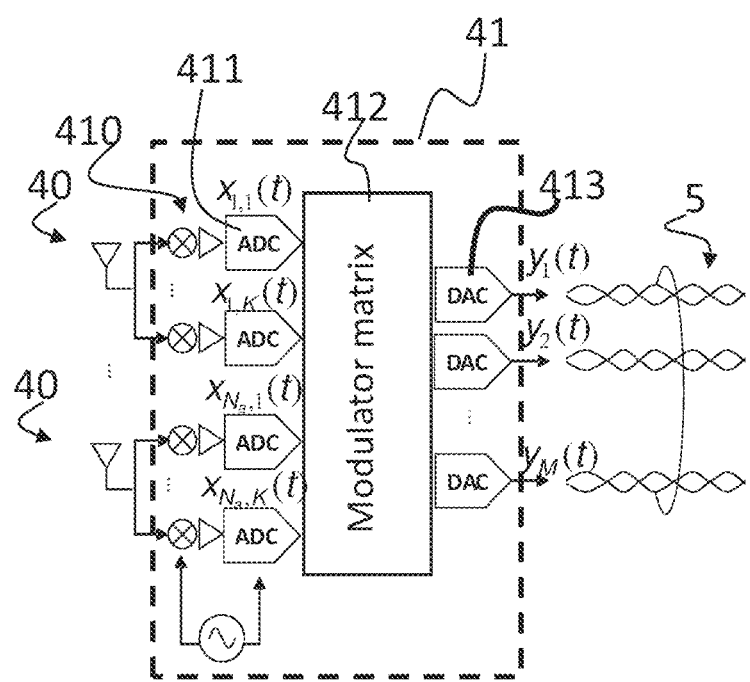
FIG. 6 illustrates a RU according to a second embodiment of the invention.

In one embodiment illustrated in FIG. 6, the SF2SF mapping method implemented by the conversion unit is employed on digital baseband signals. In this embodiment, conversion unit 41 comprises downconverters 410, analog-to-digital converters (ADCs) 411, a modulation matrix 412 and digital-to-analog converters (DACs) 413. RF signals received by the Na antennas of the RU are downconverted to generate analog baseband signals $X_{i,j}$, wherein i indicates the antenna and j the RF channel received by antenna i.

Each baseband signal $X_{i,j}$ is digitalized by an ADC 411 which is connected to an input of the modulation matrix 412. Modulator matrix 412 implements a digital processing of the input digital signals and provides output to a selected DAC 413 whose output is connected to a respective pair of the M twisted pairs (or more in general to a cable link) included in the cable 5 connecting the RU to the BBUs.

Modulator matrix 412 maps the bandwidths of the RF signals and the antennas to the cable links as exemplified by the following formula:

$$y_m(t) = \Sigma_{n \in N(m)} \Sigma_{k \in K(m)} x_{n,k}(t) \exp(j\omega_m(n,k)t)$$

Namely, for the output signal $y_m(t)$ transmitted on the m-th copper cable link (e.g. a twisted pair), the set of antennas N(m) and bandwidths K(m) that are mapped therein depends on the SF2SF conversion policy (either static or dynamic) $\omega_m(n, k)$, that in turn is the result of the SF2SF mapping optimization.

In one embodiment, modulator matrix 412 maps the antennas to cable links (if in uplink) and can possibly carry on a set of operations such as scaling the amplitudes to comply with interference and spectral requirements, or even carry out some processing such as beamforming-before-mapping in uplink (or beamforming-after-demapping if in downlink):

$$y_m(t) = \Sigma_{n \in N(m)} \Sigma_{k \in K(m)} \alpha_n x_{n,k}(t) \exp(j\omega_m(n,k)t)$$

for a predefined choice of the beamformers weights $\alpha_n$ for baseband-equivalent signals.

As known, every use of one twisted pair as copper cable link is controlled by differential-mode voltage drivers. A further improvement comes from the fact that every cable containing twisted pairs can be used either by considering one-link per pair, or two-link per pair in the joint common-mode voltage and differential-mode voltage. This means that for a group of M twisted pairs connected in a point-to-point link there are up to 2M−1 different copper cable links that can be used with a corresponding increasing of space-dimensions over cable. This is the well-known phantom-mode communication over cables, also disclosed by patent U.S. Pat. No. 6,507,608, and it requires some electrical arrangements to couple the common-modes and differential-modes for all the wires of the cable as disclosed therein.

Figure 7:
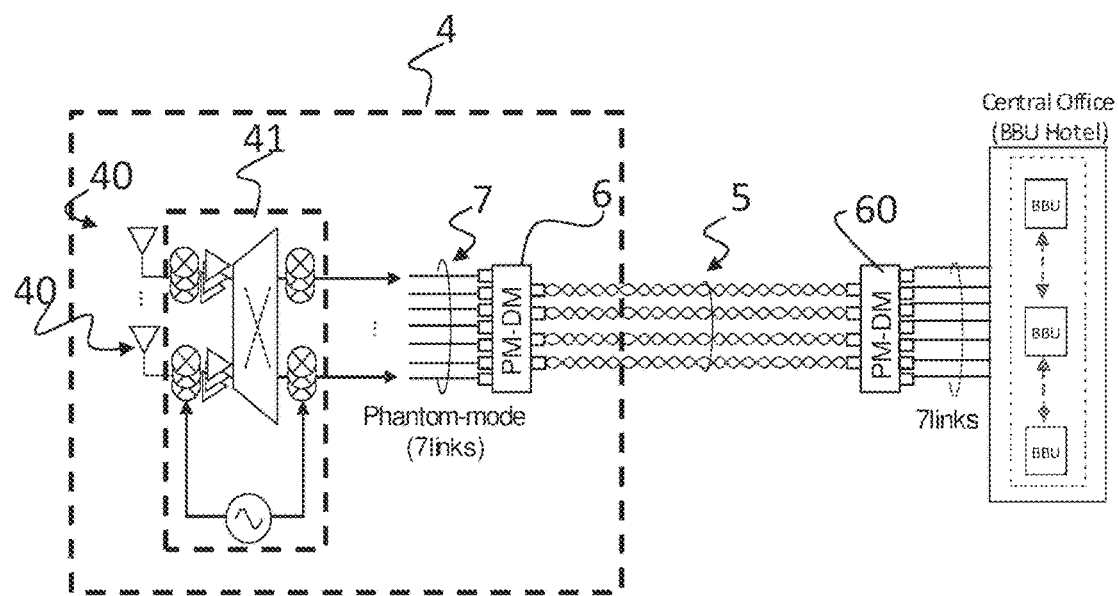
FIG. 7 illustrates a remote unit according to a third embodiment of the invention.

In the embodiment of FIG. 7, the RU 4 comprises a conversion unit 41, which can be any of the conversion unit 41 of FIG. 3 or 6, and a phantom-mode (PM) to direct-mode (DM) mapping unit 6, per se known and typically including a combination of electrical transformers with 2M−1 electrical signals as input, to M pairs (with two wires each) as output.

In this embodiment, conversion unit 41, in the uplink mode, receives RF signals from $N_a$ antennas and downconverts them transmitting the relative LF signals to the PM-DM mapping unit 6, which, in turn, receives as input the LF signals output by conversion unit 41 over the cable links 7 and maps the relative differential-mode voltages and a combination of the common-mode voltages (for a total of 2M−1 independent signals) over the four pair cable 5, thereby realizing seven copper cable links. The PM-DM 60 dually extracts the 2M−1=7 independent signals from cable 5 and provides them to the BBU.

Each cable 5 augments the transport capability of differential-mode voltages by introducing the exploitation of the phantom mode link obtained by the common-mode voltages on the same LF bandwidth by using coil transformers for PM-DM 6 and PM-DM 60.

The twisted-pair copper cable by M pairs increases the LF bandwidth capability from M cable links, if transmitting over cable in differential-mode (DM) on each pair, to 2M−1 cable links if transmitting DM and PM. In the example of CAT5 in Table 2, the overall bandwidth of cables by exploiting the PM capability becomes 7×400 MHz=2800 MHz (or higher with better cables or shorter cable length), and this offers additional degrees of freedom for packing methods with a larger number of antennas (e.g., up to 28 antennas with 100 MHz each as 28×100 MHz=2800 MHz of RF signals) or a larger RF bandwidth or any combination thereof.

PM-DM mapping unit is useful when there is the need to allocate a very large number of antennas, and/or large RF bandwidth and/or multiple RF signals from multiple antennas and RF carriers. However, the transmission of phantom-modes can increase the FEXT as each link on cable is now affected by 2M−2 interfering cable links, but this increased FEXT can be traded within the SF2SF method for packing downconverted RF signals over cable on a larger overall bandwidth (e.g., 2800 MHz for CAT in the example) with minimal FEXT interference.

The above description of a limited number of embodiments of the present invention clearly provides the evidence of the advantages of the present invention over the prior art. It is, nevertheless, clear that the above embodiments have been disclosed only for illustrative purposes, and several modification or combination of the above disclosed embodiments are possible.

As an example, although the embodiments have been provided for the uplink, it is clear that the invention can be applied also to downlink connections, wherein signals are transmitted from the network to the mobile user equipments accessing the network via the radio access network 1.

In this case, the conversion unit 4 is configured to
receive an electric signal from the BBU over at least one copper cable, the electric signal being transmitted in a LF band centered on a LF central frequency,
up-converting the received electric signal from the LF band to a RF band having same bandwidth of the LF band and being centered around a RF central frequency being higher than the LF central frequency,
transmit the up-converted electric signal via a radio link by means of an antenna, wherein the antenna and the RF band are selected according to a predetermined criteria between a plurality of antennas and a plurality of RF bands.

In case of a conversion unit of FIG. 6, analogue signals received over the copper cable 5 are digitalized, up-converted in a given RF band and transmitted over a selected antenna; RF band and antenna can be selected over a plurality of antennas and RF bands based on predetermined criteria or based on control signals received by the conversion unit 41 over cable 5.

In case of a RU 4 of the type of FIG. 7, in downlink PM-DM mapping unit 6 maps the LF signals received over cable 8 over the seven links provided by the four pair cable 7 by means of phantom mode transmission.

Uplink and downlink can coexist on the same cable 5 by allocating the uplink LF band to be disjointed from downlink LF band to avoid any interference and preserve the signal integrity (known as frequency division duplex −FDD), or allocated in disjointed uplink/downlink temporal usage (known as time division duplex −TDD), or any combination FDD/TDD. To exemplify for the FDD, the CAT5 cable in Table 2 can allocate 0-100 MHz to 4 antennas in uplink (e.g., ant#1,2,3,4), 100-200 MHz to 4 antennas in downlink (e.g., ant#1,2,3,4 possibly different RF bands from uplink), 200-300 MHz to 4 antennas in uplink (e.g., ant#5,6,7,8) and 400-500 MHz to 4 antennas in downlink (e.g., ant#5,6,7,8 possibly different RF bands from uplink). Furthermore, using phantom-mode in cable, one can allocate 0-100 MHz to 7 antennas in uplink (e.g., ant#1,2,3,4,5,6,7), 100-200 MHz to 7 antennas in downlink (e.g., ant#1,2,3,4,5,6,7 possibly different RF bands from uplink).

Additionally, it should be pointed out that in one preferred embodiment, the invention provides for a method for allocating radio access network resources in a mobile radio network, wherein cable 5 connecting the remote unit with the central unit is used also for a static (e.g., using power over Ethernet) and dynamic power supply of the RU. Dynamic power supply can release the usage of the cable 5 used for power supply of the RU in normal operation mode, to the transport of translated RF signal and data/voice to cope with temporary traffic peak needs that demand augmented cable links capabilities.

Figure 8:
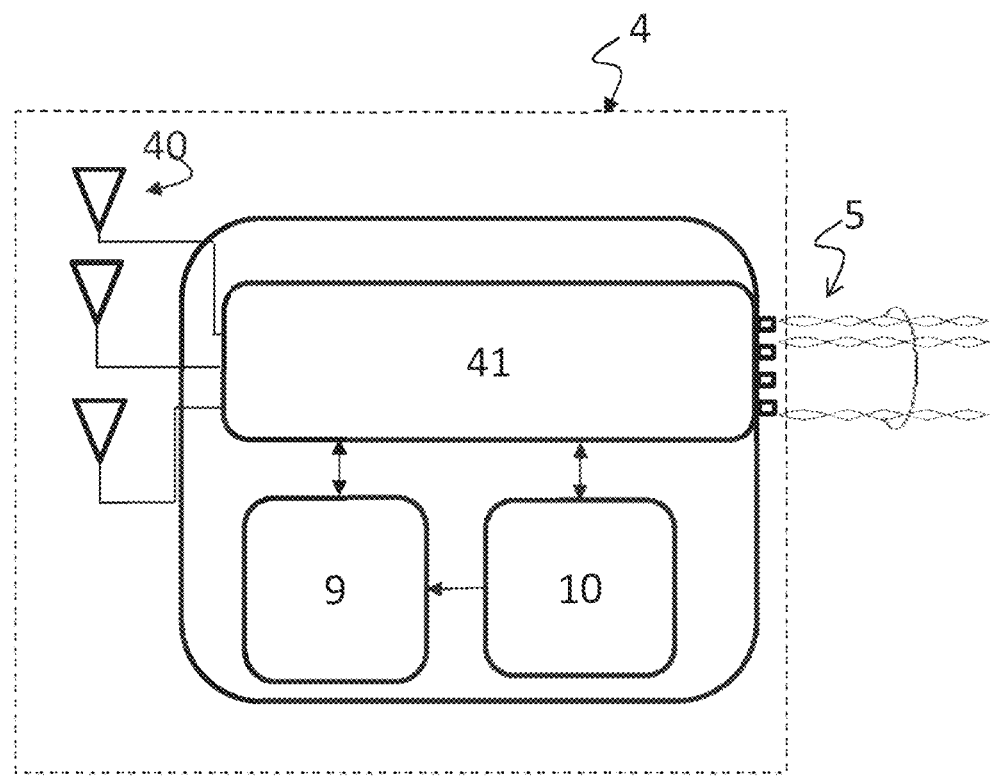
FIG. 8 illustrates a remote unit according to a fourth embodiment of the invention.

In this embodiment, illustrated in FIG. 8, RU 4 comprises an energy storing unit 9, such as a battery or a supercapacitor or any energy storing device, for storing energy provided via the cable 5, and a power controller 10 for dynamically connecting the energy storing unit 9 to the conversion unit 4 and to the other active elements of the RU to supply them and/or to the cable 5 for charging the energy storing unit 9.

Conversion unit 41 is, therefore, configured to allocate LF bands to the downconverted RF signals for voice/data signals exchanged over cable 5, and to allocate a portion of cable 5 to the power supply using either at least two common-mode connections of the twisted pairs in the so called phantom power, or at least a twisted pair, or any combination. As an example, when traffic over the network is not high, then conversion unit allocates one of the pair of cable 5 to the power supply of the RU, therefore charging the energy storing unit 9 and power supplying the conversion unit 41 and the other active elements of the RU 4. In case of peaks of transport requests between BBU and RU, conversion unit 41 controls the power controller 10 in order to power supply the RU 4 via the energy storing unit 9 and allocates the twisted pair previously used for power supply, to the transmission/reception of LF signals to/from the BBU.

In conclusion, conversion unit 41 is configured to allocate access network resources, cables, antennas and frequency bands, to the transmission/reception RF signals of voice or data and/or power supply. SF2SF method can map the RF signals from multiple antennas and multiple RF bands to LF bands of cable links, by packing the RF signals to minimize the cable interference and by accommodating the dynamic power supply.

Figure 9:
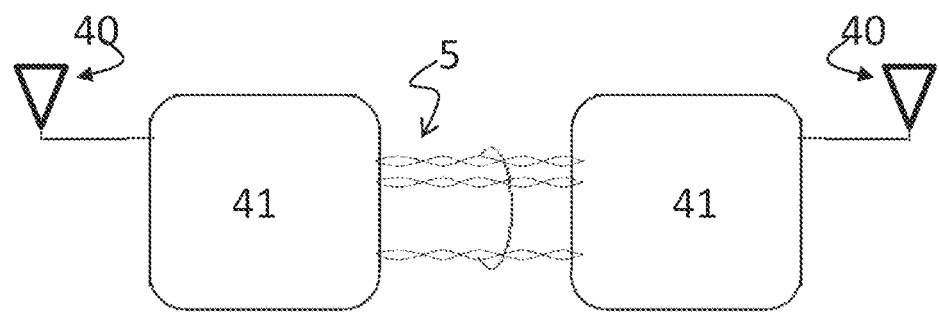
FIG. 9 illustrates a data transport system according to the invention.

Additionally, it should be pointed out that, although the invention has been described with reference to the particular embodiment of a radio access network, it should be understood that the conversion unit and the up-link and down-link transport methods above described can be used/applied to different situations. As an example, if any shielding, such as a train carriage or a building, prevents the realization of a direct radio link, it is possible to use two conversion units to receive the radio signals at one side of the building (or outside of train carriage), implement a cable link through the building and retransmit the radio signals at the other side of the building (or inside a train carriage) as in FIG. 9.

The conversion unit and the SF2SF method can be used to transport RF signals over cable channels originated from Wi-Fi connections or WLANs (Wireless Local Area Networks), or microwave links.

The invention claimed is:

1. A method for transporting radio signals over copper cables, comprising:
   receiving at least one RF signal in a radio-frequency band centered around an RF central frequency,
   downconverting said at least one RF signal from the RF band to a LF band having same bandwidth of the RF band and being centered around a LF central frequency being lower than the RF central frequency, and
   transmitting the downconverted RF signal on a copper cable link provided in a copper cable, each copper cable link comprising at least one twisted pair,
   wherein the cable link and the LF band are selected among a plurality of LF frequency bands and a plurality of copper cable links according to a predetermined criteria which minimizes the far-end crosstalk.

2. The method according to claim 1, further comprising receiving control commands and dynamically selecting wherein said copper cable link and said LF band based on the received control commands.

3. The method of claim 1, wherein said predetermined criteria provides for selecting two or more LF bands, and wherein the method comprises downconverting the at least one RF signal in said two or more LF bands so as to obtain two or more respective LF signals, and transmitting the two or more LF signals onto one or more selected copper cable links.

4. The method of claim 1, wherein RF signals are analog signals and wherein downconverting the received RF signal comprises:
   downconverting the RF signal to the LF band,
   converting the downconverted signals into digital LF signals,
   processing the digital LF signals, and
   converting the processed digital LF signals into analog LF signals.

5. The method according to claim 1, wherein two RF signals are received and downconverted in respective LF bands and wherein transmitting the two downconverted signals on copper cable links comprises:
   generating common mode and differential mode voltages for the two downconverted signals, and
   transmitting the common mode and differential mode voltages over two cable links.

6. The method of claim 5, further comprising dynamically allocating one or more of the copper links used for transmission of LF signal to the power supply.

7. The method of claim 5, wherein a plurality of RF signals are received and downconverted in respective LF bands and wherein transmitting the plurality of downconverted signals on copper cable links comprises:
   generating common mode and differential mode voltages for M pairs, with M integer, of said plurality of downconverted signals, and
   transmitting the M differential mode voltages and M−1 combinations of the common mode voltages on 2M−1 copper links obtained in a cable comprising M twisted pairs, and
   further comprising dynamically allocating one or more of the copper links used for transmission of LF signal to the power supply.

8. The method according to claim 1, wherein a plurality of RF signals are received and downconverted in respective LF bands and wherein transmitting the plurality of downconverted signals on copper cable links comprises:
   generating common mode and differential mode voltages for M pairs, with M integer, of said plurality of downconverted signals, and
   transmitting the M differential mode voltages and M−1 combinations of the common mode voltages on 2M−1 copper links obtained in a cable comprising M twisted pairs.

9. The method according to claim 1, wherein the copper cables comprises a plurality of twisted pairs and wherein the method provides for dynamically allocating a twisted pair of said plurality of twisted pairs alternately for power supplying of an active element and for transmission/reception of the signal in the LF band.

10. A method for transporting radio signals over copper cables, comprising:
    receiving at least one RF signal in a radio-frequency band centered around an RF central frequency,
    downconverting said at least one RF signal from the RF band to a LF band having a same bandwidth of the RF band and being centered around a LF central frequency lower than the RF central frequency, and
    transmitting the downconverted RF signal on two or more copper cable links provided in a copper cable, each copper cable link comprising at least one twisted pair,
    wherein the two or more copper cable links and the LF band are selected according to a predetermined criteria among a plurality of LF frequency bands and a plurality of copper cable links.

11. A method for transmitting signals transported over copper cables, comprising:
    receiving an electric signal over a copper cable link, which comprises at least a twisted pair, the electric signal being transmitted in a LF band centered around a LF central frequency,
    up-converting the received electric signal from the LF band to a RF band having same bandwidth of the LF band and being centered around a RF central frequency being higher than the LF central frequency, and
    transmitting the up-converted electric signal to an antenna for radio transmission, wherein the antenna and the RF band are selected among a plurality of antennas and a plurality of frequency bands according to a predetermined criteria which minimizes the far-end crosstalk.

12. A conversion unit comprising:
    an RF interface comprising a plurality of RF connections for receiving and transmitting RF signals in RF bands, an LF interface for receiving and transmitting LF signals in LF bands over a plurality of copper cable links connected to the LF interface, wherein the conversion unit is configured for downconverting a RF radio signal received at the RF interface in a first RF band from the first RF band to a first LF band of the LF bands, up-converting an electric signal received via one of the copper cable links in a second LF band from the second LF band to a second RF band, wherein the first and second LF bands have the same bandwidth respectively of the first and second RF bands and wherein the first and second RF bands are centered on respective RF central frequencies being higher than the LF central frequencies of the first and second LF bands, and wherein the conversion unit is adapted to select the copper cable link and the first LF band on which transmitting the downconverted RF signal according to a predetermined criteria between a plurality of RF frequency bands and said plurality of copper cable links, and to select the RF connection and the second RF band on which transmitting the upconverted LF signal according to a predetermined criteria between said plurality of RF connections and a plurality of RF bands.

13. The conversion unit of claim 12, wherein the conversion unit is adapted to transmit the downconverted RF signal on two or more copper cable links of said plurality of copper cable links.

14. The conversion unit of claim 12, wherein the conversion unit is adapted to transmit the downconverted RF signal on two or more LF bands having same bandwidth of the first RF band and being centered on LF central frequencies being lower than the central frequency of the first RF band.

15. A remote unit, comprising:

a conversion unit according to claim 12, an energy storing unit and a power controller, wherein the power controller is operatively connected to the conversion unit and is adapted to connect a copper cable link of said plurality of copper cable links to said energy storing unit in response to a command from the conversion unit.

16. A remote unit according to claim 15, further comprising at least one active element connected between the RF interface of said conversion unit and one or more antennas, said at least one active element being connected to the energy storing unit whereby active element can be supplied via said energy storing unit.

17. A radio access network comprising a remote unit according to claim 15 and at least a base band unit, wherein the remote unit and the base band unit are connected via one or more copper cables including said plurality of copper cable links.

* * * * *